3,193,504
HYDRAULIC TRANSMISSION FLUID AND ANTI-OXIDANT ADDITIVE THEREFOR
Wendell F. Ford, Jr., Daniel O. Popovac, and Roy C. Sias, Ponca City, Okla., assignors to Continental Oil Company, Ponca City, Okla., a corporation of Oklahoma
No Drawing. Filed May 5, 1960, Ser. No. 26,940
10 Claims. (Cl. 252—75)

This invention relates to a compounded mineral lubricating oil and more particularly to a superior oxidation inhibitor therefor. In another aspect, the invention is directed to a hydraulic transmission fluid adapted for use in the automatic transmissions of heavy duty motor vehicles, such as buses, trucks, and earth moving equipment. This application is a continuation-in-part of our application Serial No. 609,547, filed September 13, 1956, entitled "Hydraulic Transmission Fluid," and now abandoned.

One of the principal objects of this invention is to provide a hydraulic transmission fluid of this type which meets rigorous requirements for this service, including oxidation and corrosion resistance, extreme pressure and oiliness characteristics to avoid noise or "squawk" in the transmission, and stability over a wide operating temperature range without detrimental effect on synthetic rubber seals, while at the same time permitting the use of a refined mineral lubricating oil as the predominant constituent of the composition and at the same time also providing a composition which is low in cost.

Other objects and advantages of the invention will be apparent from the following description and the appended claims.

In automatic transmissions employing fluid drive or a torque converter, the hydraulic fluid performs the functions of a power transmission medium, a heat transfer medium, and a lubricant for bearing surfaces.

Rigorous requirements have been set up to qualify a hydraulic fluid for this service. As for example, it must possess a high flash point and a high fire point in order to minimize fire hazards in operation and reduce the tendency towards cavitation caused by vaporization in the hydraulic power transmission section. In addition, the fluid must not have a detrimental effect on copper alloys, as determined by its ability to pass a copper-strip corrosion test, must be able to withstand prolonged heating and high temperatures without decomposition, must have no deleterious effect on synthetic or rubber seals used in automatic transmissions, and must have a high degree of oxidation resistance. Finally, the fluid must possess excellent antifriction properties involving oiliness and extreme pressure characteristics as determined by its ability to function in the automatic transmission without chatter or "squawking," which latter is a high-pitched sound produced by a "stick-slip" phemonenon of the clutch plates, particularly in the second and third up-shift. Another requirement is that the transmission fluid should pass the so-called cycling test, which involves operation in the transmission through repeated cycles of idling to full throttle at a transmission oil temperature of 275° F. over a substantial period of time without substantial deposition or sludge or carnish formation. In addition, there should be no scoring of the clutch plates even after prolonged use of the fluid.

In order to meet these unusual requirements in respect to high flash and fire points while still permitting the use of a refined mineral lubricating oil as the predominant ingredient, constituting at least 95 percent by weight of the fluid and thereby avoiding the use of the more expensive synthetic lubricating bases for this purpose, it has been found that certain types and amounts of additives can be added to the oil and still satisfy the other requirements of the hydraulic transmission fluid.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

In its broadest aspect, the present invention comprises the preparation of a hydraulic transmission fluid comprising as antioxidants a metal dialkyl dithiocarbamate and a phenolic antioxidant. Still broadly stated but in more narrow respect, the present invention comprises the preparation of a hydraulic transmission fluid comprising:

(1) Mineral lubricating oil
(2) Oil-soluble dispersing agent
(3) Oil-soluble rubber swell control agent
(4) Oil-soluble antioxidant consisting of a mixture of:
    (a) A metal dialkyl dithiocarbamate
    (b) A phenolic antioxidant
(5) Pour point depressant (optional, particularly in some cases)
(6) Antifoam agent, and
(7) Viscosity index improver (optional, particularly in some cases)

The oil-soluble rubber swell control agent is preferably an oil-soluble metal sulfurized phenate, and the dispersing agent is preferably an oil-soluble alkaline earth metal sulfonate.

Before proceeding with the specific examples illustrating our invention, it may be well to enumerate the different materials which are suitable and also state the amount of each that can be used.

As to the mineral lubricating oil, we have found that, in general, any lubricating oil having a viscosity index of about 50 or more is suitable.

With regard to the metal dialkyl dithiocarbamates which may be employed, we wish to disclose these as having the following structure:

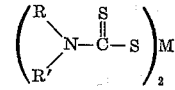

wherein R and R' are aliphatic hydrocarbon radicals of sufficient length to impart oil solubility to the compound and is preferably from 2–14 carbon atoms in length. M is a metal and includes lead, zinc, cadmium, manganese, and dialkyl tin groups having the formula:

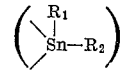

wherein $R_1$ and $R_2$ are alkyl groups having 1–14 carbon atoms which may be selected to impart oil solubility otherwise lacking in the tin dithiocarbamate due to the particular R and R' radical length. Specific examples of the metal dialkyl dithiocarbamate are zinc dibutyl dithiocarbamate, zinc diamyl dithiocarbamate, lead diamyl dithiocarbamate, cadmium diamyl dithiocarbamate, dibutyl tin diamyl dithiocarbamate, zinc di(2-ethylhexyl) dithiocarbamate, zinc octyl-butyl dithiocarbamate, cadmium propyl-octyl dithiocarbamate, zinc dioctyl dithiocarbamate, zinc dinonyl dithiocarbamate, cadmium dicetyl dithiocarbamate, and cadmium dibutyl dithiocarbamate.

The phenolic antioxidants to be used in combination with the thiocarbamates of this invention include 2,6-alkylated paracresols and alkylated bis-phenol, alkylated methylene bis-phenol and alkylated thio-bis-phenol. These have the formula as follows:

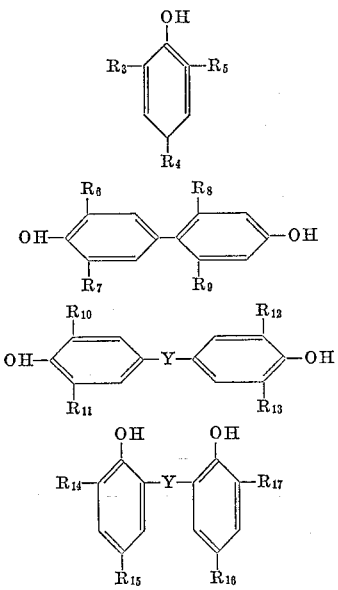

wherein the R's are alkyl groups of one to six carbons, preferably at least one of the R groups ortho to the hydroxyl radical is a tertiary butyl group, Y is a methylene group ($-CH_2$) or a sulfur atom ($-S-$). Specific examples of the phenolic which may be employed are 2,6-ditertiary butyl-para-cresol; 4,4'-bis(2,6-ditertiary butyl phenol); 4,4'-methylene bis(2-methyl-6-tertiary butyl phenol; 4,4'-thiobis-2-methyl,6-tertiary butyl phenol; 2,2'-methylene-bis(4-methyl, 6- tertiary butyl phenol); and 2,2'-thiobis(4-methyl-6-tertiary butyl phenol).

The total antioxidant concentration, inclusive of both the thiocarbamate and phenolic should be about one-tenth weight percent to one weight percent.

Suitable metal sulfurized alkyl phenates include the oil-soluble alkaline earth metal sulfurized alkyl phenates. These compounds have been described in the patent literature; and for a further description of such compounds which are suitable in our process, reference is made to U.S. Patents 2,362,289 and 2,399,878, which disclosures are made a part of this application. The compounds are only briefly described here as conforming to the formula below:

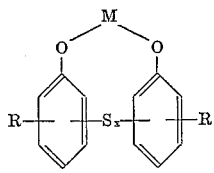

wherein M represents a metal selected from the group consisting of calcium, barium, and magnesium. The R's are alkyl radicals from 6 to 20 carbons and preferably are nonyl or dodecyl radicals, $x$ is an integer varying from 1–2, inclusively.

As far as the alkaline earth metals are concerned, we prefer generally barium or calcium, although other metals of this group are satisfactory.

Oil-soluble alkaline earth metal sulfonates include alkyl sulfonates, alkyl aryl sulfonates, the so-called mahogany or petroleum soaps, and the like. The mahogany soaps include particularly the oil-soluble aromatic sulfonates from petroleum. Many of the aromatic sulfonates have cycloalkyl (i.e., naphthenic) groups in the side chains attached to the benzene ring. The mahogany soaps may include nonaromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atom for oil solubility. The alkaryl sulfonates, however, require an alkyl portion totaling only about 18 carbon atoms. To obtain the requisite oil solubility, therefore, requires that the hydrocarbon portion of the sulfonate have a molecular weight between about 350 and 1,000. Preferably, this molecular weight is between 400 and 700. In addition to the foregoing sulfonates, the diwaxbenzene sulfonates and diwaxtoluene sulfonates may be used. The wax used in making the wax aromatic sulfonate is obtained from different sources of crude petroleum oil. Various grades of paraffin wax are made with different melting points. The 126–128° F. (52.2–53.3° C.) melting point wax is a mixture of organic compounds with molecular weight averaging in the range of 330–340. The average carbon content of this mixture of organic compounds will be around 24. As the melting point of the wax decreases, the carbon content of the mixture will average as low as 18 or a little lower.

Other sulfonates which may be used in the process of this invention include, for example, mono- and polywax substituted naphthalene sulfonates, diphenyl ether sulfonates, naphthalene disulfide sulfonates, diphenyl amine sulfonates, dicetyl thianthrene sulfonates, dilauryl beta-naphthol sulfonates, dicapryl nitro-naphthalene sulfonates, unsaturated paraffin wax sulfonates, hydroxy substituted paraffin wax sulfonates, tetra-amylene sulfonates, mono- and poly-chlorosubstituted paraffin wax sulfonates, nitroso-paraffin wax sulfonates, cycloaliphatic sulfonates such as lauryl-cyclo-hexyl sulfonates, mono- and poly-wax substituted cyclo-hexyl sulfonates, and the like. The expression "petroleum sulfonate" is intended to cover all sulfonates derived from petroleum products.

Excellent results are attained using the sulfonate produced by the sulfonation and subsequent neutralization and the conversion of the alkali metal salt to the alkaline earth metal salt of the detergent alkylate sometimes known as postdodecylbenzene consisting of monoalkyl-benzenes and dialkylbenzenes in the approximate mole ratio of 2 to 3. Its typical physical properties are as follows:

| | |
|---|---|
| Specific gravity at 38° C. | 0.8649 |
| Average molecular weight | 385 |
| Percent sulfonatable | 88 |
| A. S. T. M. D.—158 Engler: | |
| I.B.P. ° F | 647 |
| 5 ° F | 682 |
| 50 ° F | 715 |
| 90 ° F | 760 |
| 95 ° F | 775 |
| F.B.P. ° F | 779 |
| Refractive index at 23° C. | 1.4900 |
| Viscosity at: | |
| −10° C. centipoises | 2800 |
| 20° C. do | 280 |
| 40° C. do | 78 |
| 80° C. do | 18 |
| Aniline point ° C | 69 |
| Pour point ° F | −25 |

We have previously indicated that the antioxidants of this invention consist of two components. The first component may be defined as a phenol which has at least one and preferably two or three alkyl groups attached to the ring, and the second component may be defined as a metal dialkyl dithiocarbamate. The total quantity of the combination has been given as 0.1 to 1.0 percent by weight. The quantity of each component of the combination may also vary however. Preferably each component is employed in about equal amounts but in general the amounts of each component in the antioxidant can vary as follows:

|  | Percent |
|---|---|
| The phenolic | 25 to 75 |
| Metal dialkyl dithiocarbamate | 75 to 25 |

Almost any of the pour point depressants which have been found suitable for use in lubricating oils can be used in the transmission fluid of this invention. Those pour point depressants which can be used are any which are chemically inert to the other components selected for the composition. This also is true of the other conventional additives, and almost any of the conventional additives can be used in the practice of this invention. The suitability of any particular conventional antifoam agent, rubber swell control agent, pour point depressant, and viscosity index improver can be readily determined by routine laboratory tests for inertness to the other components in the contemplated formulation.

Pour point depressants suitable include the waxy distillation residue of a product prepared by the condensation of an acid chloride of a carboxylic acid having a molecular weight greater than 200. This particular product is described in U.S. Patent 2,287,901, issued to M. Pier et al., June 30, 1942. Another pour point depressant is the condensation product prepared by adding a low boiling aliphatic compound containing not more than 5 carbon atoms selected from the class consisting of saturated monohalides and the corresponding unsaturated compounds to an unreacted mixture of an aromatic compound and an aliphatic polyhalide having less than 10 carbon atoms and containing not more than 2 halogen atoms, and in the presence of a condensing agent. These products are described in U.S. Patent 2,336,620, issued to E. Lieber et al., December 14, 1943. Another product which we prefer because of its availability is the pour point depressant sold under the trade name "Paraflow," which is produced by condensing a mono chloroparaffin with naphthalene by means of anhydrous aluminum chloride. This particular product, together with its manufacture, is described in U.S. Patent 1,815,022, granted to Garland H. B. Davis, July 14, 1931.

The present hydraulic transmission fluid, as is true of all such hydraulic fluids, preferably includes a suitable antifoam agent. Hydraulic fluids are circulated rapidly in operation, and air may be entrapped which will tend to cause foaming. In present times, the antifoam agents most commonly employed are organic silicones. The usual silicones employed are dialkyl or mixed alkyl aryl silicones. Monomeric dimethyl silicone is one such compound used frequently as an antifoam agent. To prevent foaming, we prefer to add a small amount of a silicone polymer of high viscosity, such as a dimethyl silicone polymer having a kinematic viscosity at 25° C. of about 500 centistokes. The use of such a product in a hydraulic fluid is disclosed in U.S. Patent No. 2,662,055, granted to Charles C. Towne, December 8, 1953. A silicone polymer is conveniently employed in the form of a concentrate in a hydrocarbon solvent such as kerosene. For example, a very satisfactory concentrate for this purpose is prepared by diluting 1 gram of a dimethyl silicone polymer (500 cs. at 25° C.) with kerosene to bring the volume to 100 cs. Although the amount of antifoam agent specified is based upon the agent itself, we prefer to use it in the form of a concentrate wherein the agent is dissolved in a hydrocarbon solvent.

Certain compounds have been indicated as optional, such as a pour point depressant, a viscosity index improver, and an antifoam agent. The antifoam agent as a practical matter would be included without exception, as it is considered as essential although it can be left out. The inclusion of a pour point depressant and a viscosity index improver may not be required or desired in some cases. The inclusion of same, depending on the particular physical properties, such as viscosity or viscosity index, desired by the formulation and due to the particular mineral oil selected. An example of one viscosity index improver of the many known in the art which may be employed in this invention is the alkylate "bottoms" of U.S. Patent No. 2,683,120, granted to Louis A. Jennings and Julius J. Schlaer on July 6, 1954, and the teachings of that patent are made a part hereof with the exception that our antioxidant is to be employed in the formulation. The acrylic esters are, of course, known to be and used for viscosity index improvers. Where a viscosity index improver is employed, the quantities of other additives remain substantially the same; however, the quantity of mineral oil employed is less. The weight percent of mineral oil is lower by an amount equal to the amount of viscosity index improver.

It is desired to point out here that preferred rubber swell control agent, the metal sulfurized phenate previously mentioned, has to some extent the property of being a dispersing agent also. It is, however, added here for its control on the rubber components such as seals in a hydraulic transmission. By rubber control or rubber swell control agent is meant a compound which prohibits the shrinkage of such transmission components. Some swelling of the rubber is desired, but of course excessive rubber swell is not desired. The details of control of the swell of rubber in transmissions is well known in the art, and transmission fluids commonly provide for such.

It is also desired to point out that the sulfonates heretofore discussed as preferred dispersing agents also have some benefit with respect to inhibiting rust, although the preferred formulation at least has no particular need for rust inhibition.

In preparing the hydraulic transmission fluid compositions of this invention suitable and preferred ranges of the different components on a weight basis vary as follows:

| Component | Suitable | Preferred |
|---|---|---|
| Mineral lubricating oil | 99.5–94.5 | 99–96.5 |
| Alkaline earth metal sulfurized alkyl phenate | 0.2–2.5 | 0.5–1.5 |
| Alkaline earth metal alkyl aryl sulfonate | 0.1–1.25 | 0.25–1.0 |
| Antioxidant mixture | 0.1–1.0 | 0.2–0.5 |
| Pour point depressant | 0–1.0 | 0.1–0.25 |
| Antifoam agent, p.p.m. | 0–100 | 2–25 |

In order to disclose the nature of the preesnt invention still more clearly, the following illustrative examples will be given. It is to be understood that the invention is not to be limited to the specific conditions or details set forth in these examples except insofar as such limitations are specified in the appended claims. Parts given are parts by weight.

*Example 1*

A hydraulic transmission fluid composition prepared in accordance with this invention preferably contains the following:

|  | Parts |
|---|---|
| Pale oil | 97.55 |
| Calcium postdodecylbenzene sulfonate | 0.74 |
| Barium sulfurized phenate | 1.26 |
| Phenolic compound | .125 |
| Metal dialkyl dithiocarbamate | .125 |
| Paraflow | .2 |

Hydraulic transmission fluid compositions were prepared according to the above formulation with the exception that the amounts of antioxidant were varied as noted below. The resulting compositions were subjected to an oxidation test.

The oxidation test was as follows: 300 ml. of the oil blend was placed in a Pyrex test tube along with 17 inches each of coiled 25 ga. (B.W.G.) copper and number 36 reagent grade iron wire. The coil was elongated as much as possible and yet when placed in the tube was completely immersed in the oil. The Pyrex test tube was placed in the bath and maintained at a temperature of 300±2° F. and in such a position that the level of the bath was at least 1½ inches above the level of the oil in the tube. Air which was water saturated at 100° F. was blown through the oil at a rate of 8±0.5 liter/hour.

After 48 hours, the test was terminated, and the residue resulting from oxidation was determined and whereupon the following data were obtained:

| Antioxidant | Wt. percent | Acid number | | Percent vis. inc. | Insolubles formed 48 hours |
|---|---|---|---|---|---|
| | | New oil | Used oil | | |
| Cresol* | 0.25 | 0.08 | 1.04 | 2.3 | 42 (mg.) |
| Cresol | 0.50 | 0.04 | 1.33 | 3.4 | 39 |
| Zinc dibutyl dithiocarbamate | 0.46 | 0.21 | 1.33 | 2.5 | 87.0 (mg.) |
| Do | 0.10 | | | | |
| Cresol | 0.25 | 0.04 | 0.41 | 1.4 | 4.8 |

*For brevity, ditertiary butyl-paracresol is identified merely as "Cresol."

The insolubles formed were determined by dissolving 10 grams of the test oil in 100 ml. of A.S.T.M. precipitation grade naptha and allowed to stand for at least one hour and then filtered through a Gooch crucible and washed with 100 ml. of A.S.T.M. precipitation grade naphtha. The Gooch crucible was then dried in an oven at 125° C. for one hour, cooled, and weighed.

In Example 1, the amounts of all components used in the hydraulic fluid were kept constant, with the exception of the amounts of the two antioxidants and the pale oil. The amounts of the antioxidants were varied as noted above, and the amount of pale oil was varied so that the total composition was equal to 100 per cent.

*Example 2*

Hydraulic transmission fluid compositions of the invention were prepared with the amount of the barium sulfurized phenate being varied as noted below. The resulting compositions when subjected to the rubber seal test exhibit the following data as typical:

| Parts barium sulfurized phenate | Rubber seal test | |
|---|---|---|
| | Visual | Durometer |
| 0.0 | Brittle | +7 |
| 0.32 | Stiff | +9 |
| 0.63 | Pliable | +7 |
| 1.26 | ---do--- | +4 |

The rubber seal test consisted of preparing specimens from the rubber seal material. The durometer reading was obtained on each specimen.

The specimen was placed in each of the experimental hydraulic transmission fluids at a temperature of 300±2° F. for 70 hours. At the end of 70 hours, each specimen was removed from the test fluids, dipped into a cleaning fluid and wiped lightly with a soft cotton cloth. A visual inspection was made of each specimen and the durometer reading obtained.

The Shore durometer (rubber) hardness tester is for determining hardness of rubber and similar materials from the resistance penetration by a blunt pin, in accordance with A.S.T.M. Tentative Method D676-47T.

In Example 2, the amounts of all components used in the hydraulic fluid were kept constant with the exception of the phenate and the pale oil. The amount of pale oil was adjusted so that the total composition was equal to 100 percent.

While particular embodiments of the invention have been described, it will be understood, of course, that the invention is not limited thereto since many modifications may be made, and it is therefore contemplated to cover by the appended claims any such modifications as fall within the true spirit and scope of the invention.

The invention having thus been described, what is claimed and desired to be secured by Letters Patent is:

1. An antioxidant additive for hydraulic transmission fluids comprising a mineral lubricating oil, a rubber swell control agent, a dispersing agent, an antifoam agent, said antioxidant additive consisting essentially of a metal dialkyl dithiocarbamate and a phenolic compound wherein the metal dialkyl dithiocarbamate has the formula

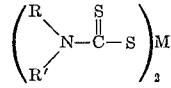

in which R and R' are aliphatic hydrocarbon radicals of 2–14 carbon atoms, M is a metal selected from the group consisting of zinc, cadmium, manganese, and dialkyl tin groups in which the alkyl radicals contain from 1 to 14 carbons and wherein the phenolic compound has a formula selected from the group consisting of:

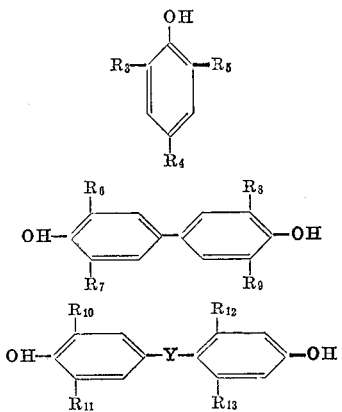

and

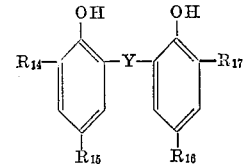

in which the R's are alkyl groups of one to six carbons, Y is a member selected from the group consisting of a methylene radical and a sulfur atom and wherein said metal dialkyl dithiocarbamate and said phenolic compound are present in relative amounts with respect to each other to provide for one to be present in the range of 25 and 75 percent and the other to be present in the range of 75 to 25 percent by weight of the total anti-oxidant system.

2. An antioxidant additive according to claim 1 wherein the metal dialkyl dithiocarbamate is zinc dibutyl dithiocarbamate and said phenolic compound is 2,6-ditertiary butyl para-cresol.

3. A hydraulic transmission fluid adapted for use with automatic transmissions of the heavy duty type, characterized by a SUS viscosity at 210° F. of 45 to 58, and a maximum viscosity of 48,000 at 0° F., consisting essentially of in parts by weight:
   (a) 99.5 to 94.5 parts of a mineral lubricating oil,
   (b) 0.2 to 2.5 parts of an oil-soluble alkaline earth metal sulfurized phenate,
   (c) 0.1 to 1.25 parts of an oil-soluble alkaline earth metal alkyl aryl sulfonate, the alkyl groups of which contain from about 15 to about 28 carbon atoms,
   (d) 0.1 to 1.0 part of an antioxidant additive consisting of 25 to 75 percent of a phenolic compound and 75 to 25 percent of a metal dialkyl dithiocarbamate wherein said phenolic compound and said metal dialkyl dithiocarbamate of said antioxidant additive conform to the formulas for same defined in claim 1, (e) 0 to 1.0 part of a pour point depressant, prepared by condensing a monochloroparaffin with naphthalene, and
(f) 0 to 100 p.p.m. of a dimethyl silicone polymer, having a kinematic viscosity at 25° C. of about 500 centistokes.

4. A hydraulic transmission fluid adapted for use with automatic transmissions of the heavy duty type, characterized by a SUS viscosity at 210° F. of 45 to 58, and a maximum viscosity of 48,000 at 0° F., consisting essentially of in parts by weight:
(a) a mineral lubricating oil, 99 to 96.5
(b) an oil-soluble alkaline earth metal sulfurized phenate
(c) an oil-soluble alkaline earth metal alkyl aryl sulfonate, the alkyl groups of which contain from about 15 to about 28 carbon atoms, 0.25 to 1.0
(d) an antioxidant additive consisting of 25 to 75 percent of a phenolic compound and 75 to 25 percent of a metal dialkyl dithiocarbamate, wherein said phenolic compound and said metal dialkyl dithiocarbamate of said antioxidant additive conform to the formulas for same defined in claim 1, 0.2 to 0.5
(e) a pour point depressant, prepared by condensing a monochloroparaffin with naphthalene, 0.1 to 0.25
(f) a dimethyl silicone polymer, having a kinematic viscosity at 25° C. of about 500 centistokes, 2 to 25 p.p.m.

5. A hydraulic transmission fluid adapted for use with automatic transmissions of the heavy duty type, characterized by a SUS viscosity at 210° F. of 45 to 58, and a maximum viscosity of 48,000 at 0° F., consisting essentially of in parts by weight:
(a) a mineral lubricating oil, 99.5 to 94.5
(b) an oil-soluble alkaline earth metal sulfurized phenate
(c) an oil-soluble alkaline earth metal alkyl aryl sulfonate, the alkyl groups of which contain from about 15 to about 28 carbon atoms, 0.1 to 1.25
(d) an antioxidant mixture consisting of 25 to 75 percent of a ditertiary butyl para-cresol and 75 to 25 percent of a zinc dialkyl dithiocarbamate in which the alkyl radicals contain from 2 to 14 carbons, 0.1 to 1.0
(e) a pour point depressant, prepared by condensing a monochloroparaffin with naphthalene, 0 to 1.0
(f) a dimethyl silicone polymer, having a kinematic viscosity at 25° C. of about 500 centistokes, 0 to 100 p.p.m.

6. A hydraulic transmission fluid adapted for use with automatic transmissions of the heavy duty type, characterized by a SUS viscosity at 210° F. of 45 to 58, and a maximum viscosity of 48,000 at 0° F., consisting essentially of in parts by weight:
(a) a mineral lubricating oil, 99.5 and 94.5
(b) an oil-soluble alkaline earth metal sulfurized phenate, having a sulfur content within the range of 5.6 to 12.9 percent, 0.2 to 2.5
(c) an oil-soluble alkaline earth metal alkyl aryl sulfonate, the alkyl groups of which contain from about 15 to about 28 carbon atoms, 0.1 to 1.25
(d) an anti-oxidant mixture consisting of 25 to 75 percent of ditertiary-butyl para-cresol and 75 to 25 percent of zinc diputyl dithiocarbamate, 0.125 to 0.8
(e) a pour point depressant, prepared by condensing a monochloroparaffin with naphthalene, 0 to 1.0, and
(f) a dimethyl silicone polymer, having a kinematic viscosity at 25° C. of about 500 centistokes, 0 to 100 p.p.m.

7. A hydraulic transmission fluid adapted for use with automatic transmissions of the heavy duty type, characterized by a SUS viscosity at 210° F. of 45 to 58, and a maximum viscosity of 48,000 at 0° F., consisting essentially of in parts by weight:
(a) a mineral lubricating oil, 99 to 96.5
(b) an oil-soluble alkaline earth metal sulfurized phenate, having a sulfur content within the range of 5.6 to 12.9 percent, 0.5 to 1.5
(c) an oil-soluble alkaline earth metal alkyl aryl sulfonate, the alkyl groups of which contain from about 15 to about 28 carbon atoms, 0.25 to 1.0
(d) an antioxidant mixture consisting of 25 to 75 percent of ditertiary-butyl para-cresol and 75 to 25 percent of zinc dibutyl dithiocarbamate, 0.2 to 0.5
(e) a pour point depressant, prepared by condensing a monochloroparaffin with naphthalene, 0.1 to 0.25, and
(f) a dimethyl silicone polymer, having a kinematic viscosity at 25° C. of about 500 centistokes, 2 to 25 p.p.m.

8. A mineral oil base hydraulic transmission fluid comprising at least about 95 percent by weight of a mineral lubricating oil, about 0.1 to 1.0 percent by weight of an antioxidant additive consisting of 25 to 75 percent by weight of a metal dialkyl dithiocarbamate that conforms to the formula defined in claim 1, and 75 to 25 percent by weight of a phenolic compound that conforms to a formula defined in claim 1, and an effective amount of a rubber swell control agent, a dispersing agent and an antifoam agent.

9. A hydraulic transmission fluid according to claim 8 which contains in addition a pour point depressant.

10. A hydraulic transmission fluid according to claim 8 wherein the rubber swell control agent is an oil-soluble alkaline earth metal sulfurized phenate, the dispersing agent is an oil-soluble petroleum sulfonate, the antifoam agent is an organic silicone compound.

References Cited by the Examiner
UNITED STATES PATENTS

| | | | |
|---|---|---|---|
| 2,336,620 | 12/43 | Lieber et al. | 252—59 |
| 2,620,302 | 12/52 | Harle | 252—33.6 |
| 2,681,891 | 6/54 | Bos et al. | 252—75 |
| 2,786,814 | 3/57 | McDermott | 252—33.6 |
| 2,856,363 | 10/58 | Brennan | 252—33.6 |

JULIUS GREENWALD, *Primary Examiner.*
JOSEPH R. LIBERMAN, *Examiner.*